Patented Aug. 12, 1952

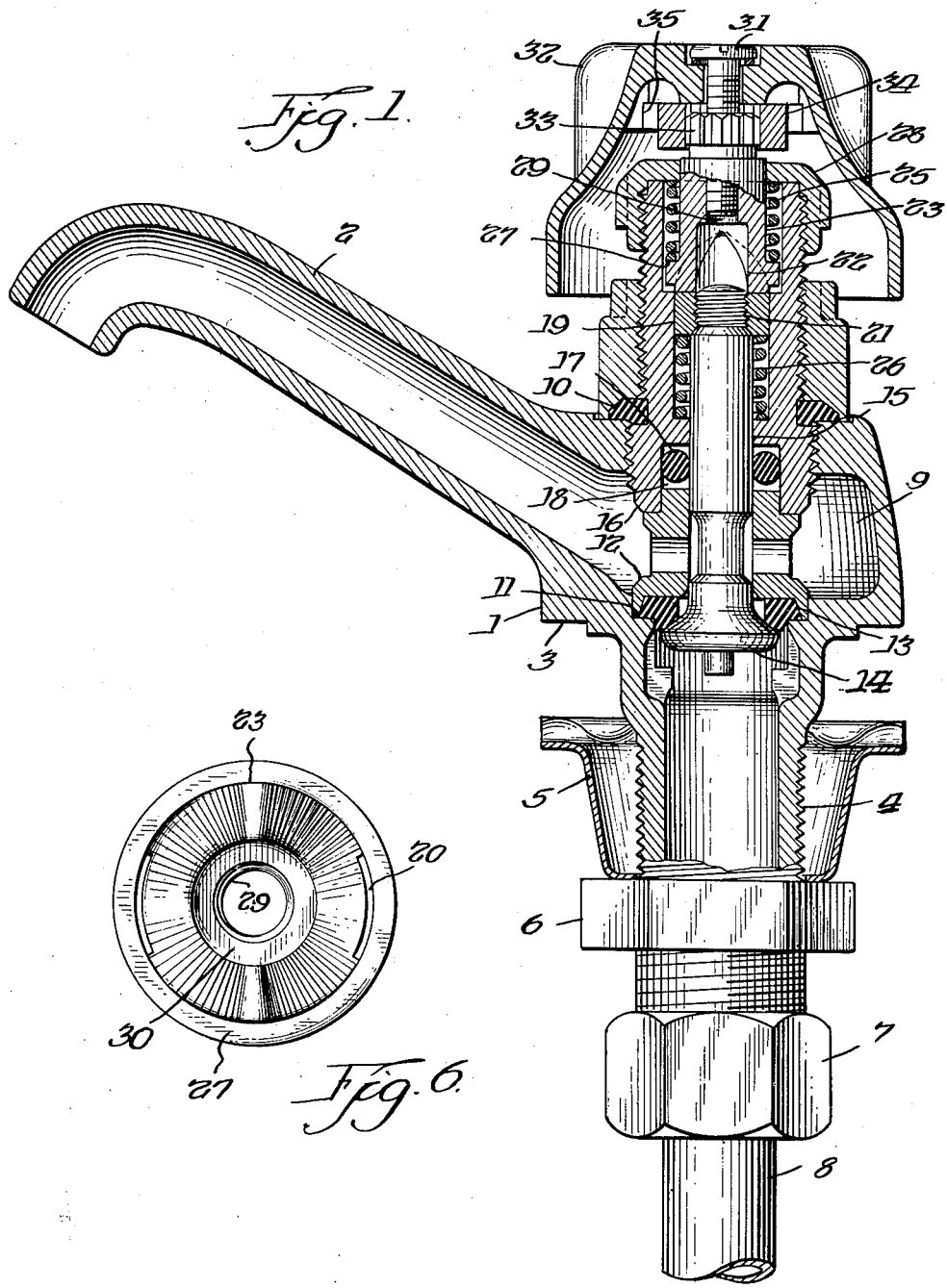

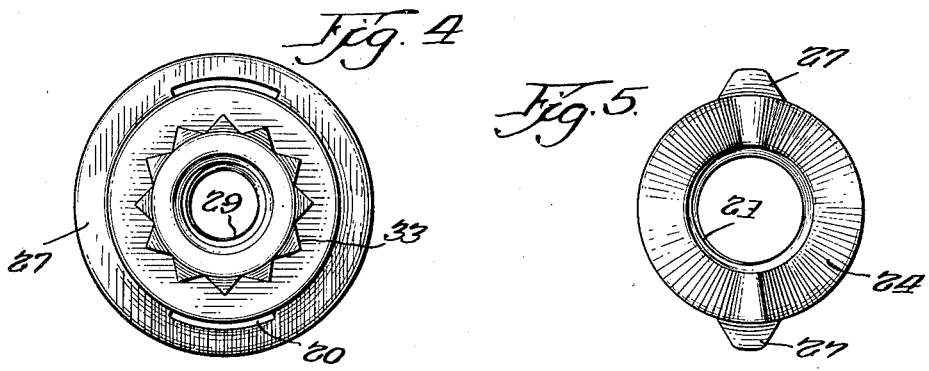
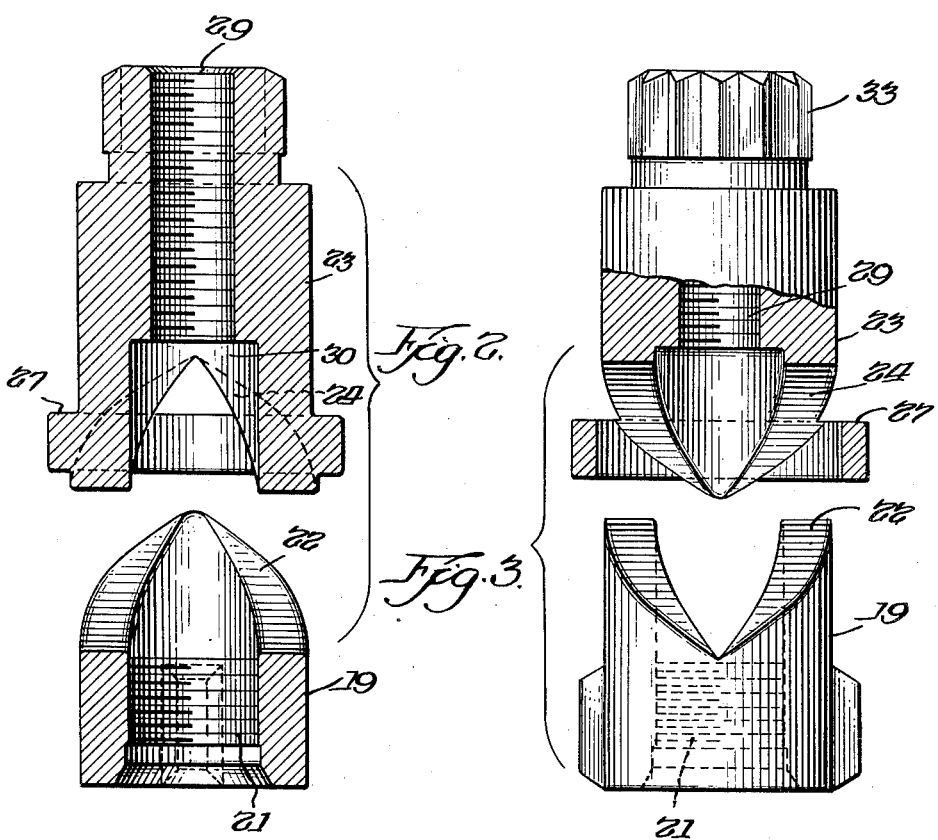

2,606,450

UNITED STATES PATENT OFFICE 2,606,450

VALVE ACTUATING MECHANISM

Carl Bolling, Chicago, Ill., assignor to Crane Co., Chicago, Ill., a corporation Application December 8, 1949, Serial No. 131,797

6 Claims. (Cl. 74—99)

This invention relates to an actuating mechanism for a faucet or like valve. More particularly, it is concerned with an improvement in the operating mechanism for a quick-opening self-closing valve, whereby objectional noises arising from necessary play or looseness in the mechanism are substantially avoided.

In order to obtain a better appreciation of the value of this inventive contribution, it should be understood at the outset that heretofore in connection with quick-opening and self-closing devices of this type, much difficulty has been experienced in maintaining quiet in handle or actuating construction. It has been discovered that the objectionable rattling was traceable largely to the usual clearances provided and the normal dimensional variations in parts due to the machining tolerances provided between cam surfaces, for example, and other machined surfaces of the assembly, causing various degrees of handle looseness and noises from vibration.

It should also be understood that heretofore in cam operated devices of this type as conventionally employed, the fixed location of the top cam member by means of a collar and a collar spacer in the centerpiece or similar actuating support member did not usually permit the cam surfaces to contact, except when the trimming was operated. The latter variation in the collar and collar spacer also caused axial and diametrical play of various degrees. It could well be understood that in movable installations where pipe lines and valves may be vibrated for many reasons, as, for example, on railroad cars or on board ship, and the like, the noises arising from such vibration would not only be annoying to passengers, but might even lead eventually to mechanical failures in certain of the operating parts that may be thus affected.

Therefore, it is one of the more important objects of this invention to provide a construction in which prior noisy collar structures and bearings are eliminated, and a spring tension is preferably provided which maintains the cams and stem mechanism in constant contact, thereby to eliminate noises normally arising therefrom.

Another object is to provide for such simple spring tension application which eliminates looseness heretofore causing objectionable noises. Thus, in eliminating play and looseness in the actuating mechanism and in the trimming assembly, the operating handle and accessory parts will not rattle, and therefore, objectionable noises coming from such sources are successfully eliminated.

Other objects and advantages of the structure will become more readily apparent upon proceeding with the following specification read in light of the accompanying drawings, in which:

Fig. 1 is a magnified sectional assembly view of a faucet embodying the invention.

Fig. 2 is a spaced-apart front sectional assembly view of the upper and lower cam members of the actuating mechanism.

Fig. 3 is a spaced-apart side fragmentary sectional assembly view of the upper and lower cam members of the actuating mechanism viewed at 90° from that shown in Fig. 2.

Fig. 4 is an exterior plan elevation of the upper cam member shown in Fig. 2.

Fig. 5 is a plan exterior view of the lower cam member shown in Fig. 3.

Fig. 6 is a bottom exterior view of the upper cam member shown in Fig. 3.

Similar reference numerals refer to similar parts throughout the several figures.

Referring now to Fig. 1, a conventional faucet body 1 is shown with the usual discharge spout 2, having the usual base portion 3 for attachment to a lavatory, sink, or the like, by means of the assembled conventional threaded shank 4, the spring washer 5, and the locknut 6, the latter member being threadedly mounted on the shank extension 4, as indicated. The threaded shank 4, in the usual manner, is provided with a connection or coupling nut 7, attached to the usual inlet tailpiece 8 connected to a source of liquid supply (not shown). Thus, pressure is applied to the underside of the valve closure and helps to make the latter tight.

The internal valve mechanism about to be described is not claimed as new and is substantially in accordance with the disclosure of U. S. patent application Serial No. 535,728, filed May 15, 1944, now Patent No. 2,520,092. It is of the type termed quick-opening and self-closing by those skilled in the art.

Thus, the body 1 is provided with the internal valve chamber 9 with the latter chamber defined by a shoulder 11 upon which the ported sleeve 12 is held in abutting relation and between which member and the shoulder the seating member 13 is clamped, as indicated, to form a liquid-tight seat for the head or closure member portion 14 of the sliding stem 15. The centerpiece 16 is held in sealed tightness by the gasket 10 and locknut, as indicated. The sleeve 12 is held in axially fixed relation to the body by means of the threaded centerpiece 16, the stem being snugly guided for longitudinal movement within the centerpiece 16 and also within the sleeve 12, as indicated. A sealing O-ring 17 is preferably mounted in the formed chamber 18 between the end of the sleeve and the recessed portion of the centerpiece to serve as a seal at the upper end portion, as indicated. The stem 15 is threaded to receive the non-rotatably mounted lower cam member 19, threaded as at 21, for rigidly supporting the lower cam member. On its upper surface, the cam member 19 is provided with the cam surface 22 for engagement with the rotatable upper cam member 23, the latter member having the similarly formed complementary cam surface 24 for abutting relation with the surface 22 of the lower cam member 19. As indicated in Fig. 4, the upper cam member 23 is relieved, as at 20, to permit accumulations of foreign matter to discharge between the cam surfaces thereinto.

To maintain the desired rattle-proof engagement of the surfaces 22 and 24 of the lower and upper cam members 19 and 23 respectively, a coil spring 25 is employed, preferably positioned so as to apply an axial load upon the upper cam member 23, as disclosed. The application spring is the essence of this invention, in that heretofore the cam members without being maintained in such positive and snug fitting relationship frequently rattled due to such causes as, for example, vibration and led to disturbing noises. So far as I know, no one previously has realized that such objectionable noises arising from the stem and cam assembly could be entirely eliminated by the interposition of the spring 25 between the shoulder provided by the undersurface of the enclosing nut 28 and the shoulder 27 of the upper cam member 23. Obviously, the use of a coil spring may be varied by the employment of other forms of resilient members similarly installed to accomplish a like beneficial result.

The lower or main spring 26 is employed solely for the purpose of maintaining the valve stem 14 on its seat 13 when the former is shouldered against the lower portion of the cam member 19.

The spring 25 is maintained in compressed relation to the upper cam shoulder 27 by means of the threaded enclosing nut 28 and is arranged so that it is either adjustable or shouldered, as indicated. At its upper portion, the upper cam member 23 is internally threaded, as at 29, to receive the actuating handle connecting screw 31 for attachment of the shrouded actuating handle 32. It will be noted that the upper portion of the cam member 23 is provided with a polygonally shaped (as more clearly shown in Fig. 4) extension 33 engaging a nut 34 (Fig. 1), the latter member seating snugly within a similarly shaped recess 35 within the undersurface of the handle 32, thereby to provide non-rotatable relationship between the latter two members.

Thus, it will be clear that a relatively simple and effective means has been provided for eliminating vibrational noises in this type of valve, forming a construction which in no way impedes the operation of the valve while rendering it impervious to objectionable rattling caused by vibration and the like.

While only a single embodiment has been shown, it should, of course, be clear that other modifications may be employed without departing from the spirit of the invention as defined by the appended claims.

I claim:

1. In a quick-opening self-closing faucet actuating means, cam operating means therefor, a sliding stem actuted by the said cam means, the upper portion of the actuating means having an enclosure for the cam operating means, the said cam means comprising upper and lower superposed members with cam surfaces normally engaged, the cam operating means including a resilient member predetermined compressed by a position of the said enclosure for maintaining the upper cam member tightly against the lower cam member to eliminate vibrational noises therefrom when the cam surfaces are normally engaged.

2. In an actuating mechanism for quick-opening self-closing faucet or the like, cam operating means therefor, a sliding stem actuated by the same, cam operating means, an enclosure for the cam operating means, the said cam operating means comprising upper and lower superposed members cooperating with the said stem, the cam operating means including a resilient member bearing between an upper interior surface portion of the enclosure and the upper cam for maintaining the said upper cam snugly and in non-vibrating relation to the said lower cam.

3. In a quick-opening self-closing faucet actuating mechanism, cam operating means therefor, a sliding stem actuated by the said cam means, an enclosure for the cam operating means, the said cam means comprising upper and lower superposed members, at least one of said members being mounted upon the said stem, the cam operating means including a resilient member for maintaining the cam means in snugly mounted relation to minimize vibrational noises therefrom, at least one of the cam operating means having annularly relieved means to receive said resilient member.

4. In actuating means for a quick-opening faucet, cam operating means therefor, a sliding stem actuated by the said cam means, the said cam means comprising upper and lower superposed members, at least one of the cam means being mounted upon the said stem and having an annular space below and adjacent the cam to receive foreign matter therefrom, a resilent member bearing against the upper member for maintaining the said upper cam in relatively snugly fitted relation to the said lower cam and stem to eliminate the occasion for vibrational noises therefrom.

5. In a quick-opening self-closing faucet actuating mechanism, cam operating means therefor, a sliding stem actuated by the said cam means, a threaded enclosure for the cam operating means, the said cam means comprising upper and lower axially aligned members with abutting cam surfaces, at least one of said members being mounted directly upon the said stem, the cam operating means including a resilient member for maintaining the cam means in snugly mounted relation to minimize vibrational noises therefrom, the upper cam operating means having annularly relieved means surrounding the cam surfaces.

6. In a quick-opening self-closing faucet actuating mechanism, cam operating means therefor, a sliding stem actuated by the said cam means, an enclosure for the cam operating means, the said cam means comprising upper and lower superposed members, at least one of said members being mounted upon the said stem, the cam operating means including a resilient member for maintaining the said cam means in snugly mounted relation to minimize vibrational noises therefrom, at least one of the cam operating means having annularly relieved means comprising oppositely disposed arcuately extending apertures adjacent the cam surfaces.

CARL BOLLING.

REFERENCES CITED

The following references are of record in the file of this patent:

UNITED STATES PATENTS

| Number | Name | Date |
| --- | --- | --- |
| 1,669,651 | Block | May 15, 1928 |
| 1,672,235 | Taylor | June 5, 1928 |
| 1,836,268 | McFarland et al. | Dec. 15, 1931 |
| 2,376,022 | Wolcott | May 15, 1945 |